Aug. 12, 1924.

C. LE G. FORTESCUE 1,504,614

ELECTRIC MEASURING INSTRUMENT

Filed Sept. 1, 1921

INVENTOR
Charles L. G. Fortescue.
BY
Wesley G. Carr
ATTORNEY

Patented Aug. 12, 1924.

1,504,614

UNITED STATES PATENT OFFICE.

CHARLES LeG. FORTESCUE, OF PITTSBURGH, PENNSYLVANIA, ASSIGNOR TO WESTING-HOUSE ELECTRIC & MANUFACTURING COMPANY, A CORPORATION OF PENNSYLVANIA.

ELECTRIC MEASURING INSTRUMENT.

Application filed September 1, 1921. Serial No. 497,756.

*To all whom it may concern:*

Be it known that I, CHARLES LeG. FORTESCUE, a subject of the King of Great Britain and a resident of Pittsburgh, in the county of Allegheny and State of Pennsylvania, have invented a new and useful Improvement in Electric Measuring Instruments of which the following is a specification.

My invention relates to electric measuring instruments and it has special relation to the measurement of the positive or the negative-phase-sequence components of unbalanced quantities of an electric circuit.

In practicing my invention, I utilize the broad principles of indicating the symmetrical components of the unbalanced quantities of an electrical system disclosed in the copending application of Charles LeG. Fortescue, Lewis W. Chubb, and Joseph Slepian, Serial No. 358,373, filed February 13, 1920, and assigned to the Westinghouse Electric & Manufacturing Company.

It has been discovered that any unbalanced polyphase system of electrical quantities may be resolved into two or more symmetrical systems. These quantities, for example, may be resolved into a positive-phase-sequence component, a negative-phase-sequence component and a zero-phase-sequence component. In a three-phase, three-wire system, the zero-phase-sequence component is of zero value and only the positive and the negative-phase-sequence components need be considered.

One object of my invention is to provide a measuring device of the above-indicated character that shall be adapted to indicate either a positive or a negative-phase-sequence component of unbalanced voltage or current in a supply circuit.

A further object of my invention is to provide novel arrangements of rotating apparatus whereby an induction machine may be caused to indicate the desired phase-sequence component.

Figure 1:
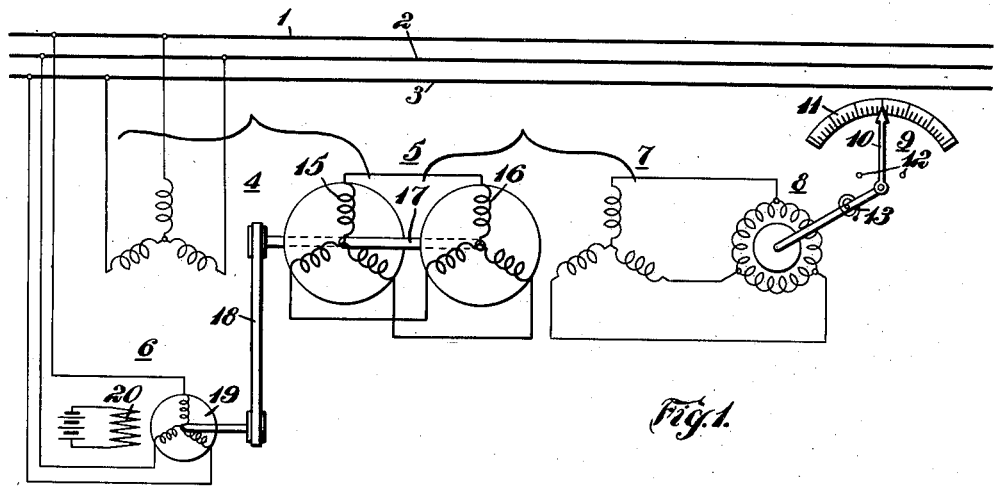
Figure 2:
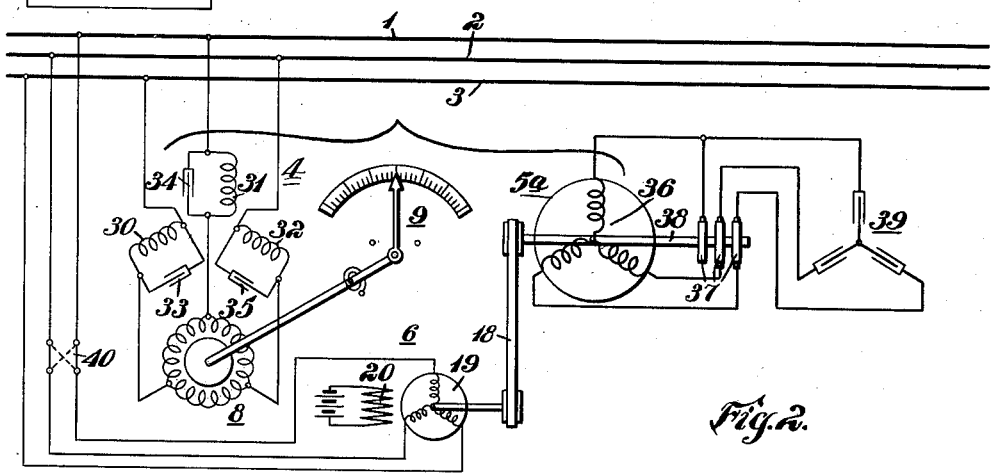
Figure 3:
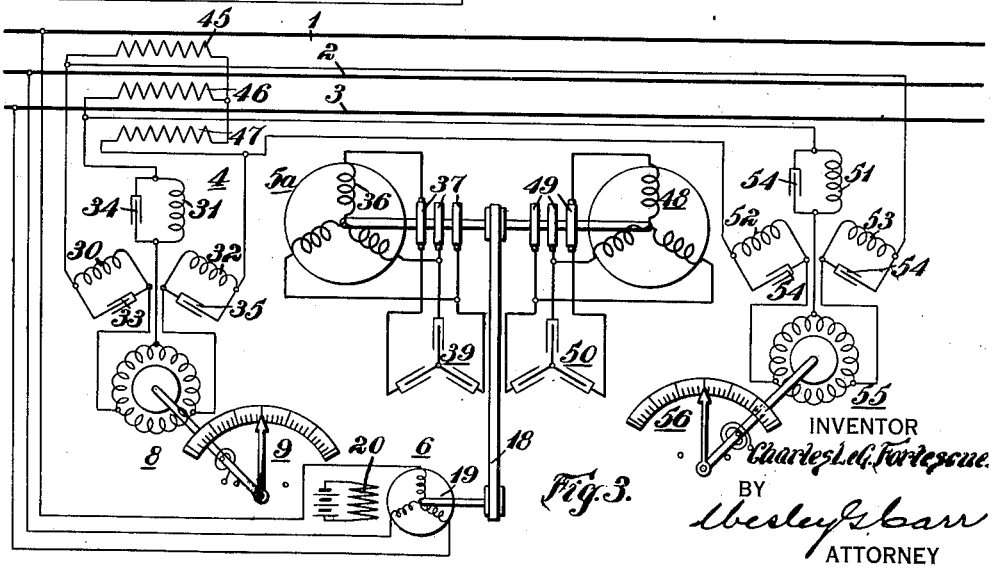

My invention may best be understood by reference to the accompanying drawings, Figure 1 of which is a diagrammatic view of a system and apparatus embodying the principles of my present invention, and Figs. 2 and 3 are diagrammatic views of other forms of the invention.

Referring to Fig. 1, the system here shown comprises a plurality of supply-circuit conductors 1, 2 and 3 upon which is impressed an unbalanced voltage by reason of an unequal distribution of load current, for example. My measuring device comprises a star-connected stator winding 4, which is connected across the three-phase supply circuit to energize a double-winding rotor 5, which is driven by a synchronous motor 6. A second stator winding 7 receives its energy by induction from the rotor 5 and is connected to a polyphase induction machine 8, the rotor of which is adapted to operate suitable indicating mechanism 9.

The mechanism 9 may conveniently comprise a pointer or arm 10 that is adapted to travel across a scale 11 to thus afford a visual indication of ciruit conditions, or the pointer 10 may be used as a relay device to operate between two stationary contact members 12. The torque produced by the induction machine 8 is opposed by a spring 13 on the pointer shaft, in accordance with familiar principles.

The rotor 5 comprises two star-connected windings 15 and 16, which are connected in series relation and are suitably mounted upon a common operating shaft 17. The synchronous motor 6 is energized from the supply-circuit conductors 1, 2 and 3 and comprises the usual three-phase winding 19 and direct-current-field winding 20, which may be energized from any suitable source. The synchronous motor 6 is adapted to drive the rotor shaft 17 by means of any suitable mechanism, such as a belt or chain 18, whereby the rotor windings 15 and 16 operate at synchronous speed in the normal direction, that is, in the direction in which the rotor tends to rotate.

The windings of the stator 4 and the windings of the rotor 15 together constitute an induction motor of the wound-rotor type and, similarly, the windings of the stator 7 and the windings of the rotor 16 constitute a motor of the wound-rotor type and are inductively related.

By reason of the illustrated connections, the electromotive force induced in the rotor windings 15 and 16 is a measure of the negative-phase-sequence voltage. A corresponding voltage is induced in the auxiliary stator winding 7, which voltage, in turn, is impressed upon the induction machine 8. In this manner, the desired negative-phase-sequence voltage indication is obtained at the mechanism 9 without the use of any slip-rings in the apparatus, by reason of the double-winding construction of the rotor 5.

In the illustrated system, the operation of the rotor 5 at synchronous speed causes elimination of the positive-phase-sequence component and, therefore, the indicating mechanism 9 serves to measure the value of the negative-phase-sequence component of the unbalanced voltage in the polyphase supply circuit.

Since the unbalanced three-phase supply circuit voltage will produce rotating balanced polyphase electromotive forces of opposite phase sequence simultaneously in the stator winding 4, the magnitudes thereof being proportional to the magnitudes of the two symmetrical components of the unbalanced voltage, it follows that the conductors of the rotor windings 15 and 16 will not cut the field flux caused by the voltage of the sequence rotating in the same direction as the rotor 5, but these conductors will cut the field flux that rotates in the opposite direction in such manner as to induce a double-frequency voltage therein, which is a measure of the negative-phase-sequence component, in the present instance.

The system illustrated in Fig. 2 comprises the supply-circuit conductors 1, 2 and 3 and the star-connected stator winding 4 comprising a plurality of independent phase windings 30, 31 and 32, which are connected between the respective supply-circuit conductors and the terminals of the induction machine 8. A plurality of condensers, or the like, 33, 34 and 35 are connected in parallel relation to the stator windings 30, 31 and 32, respectively, the proportion of parts being such that the condensers are anti-resonant with the open-circuit reactance of the machine windings to one phase-sequence component of voltage of the circuit.

A rotor 5ª comprising a plurality of windings 36 is mounted upon a suitable shaft 38, to which are also insulatedly secured a plurality of slip rings 37 for the rotor winding. Three condensers, or the like, 39 are connected in star relation to the three slip rings 37, the proportion of parts being such that the condensers become resonant with the windings to the negative-phase-sequence component under double-system-frequency conditions in the rotor windings 36. The rotor windings together with the condensers present zero impedance to the negative sequence component and thereby act as a filter.

The synchronous motor 6 is adapted to drive the rotor 5ª at synchronous speed, a suitable reversing switch 40 being provided in the synchronous circuit to permit rotation of the rotor shaft 38 in either direction.

The windings of the stator 4 are inductively related to the windings 36 of the rotor 5ª and together constitute an induction motor of the wound-rotor type.

When the rotor 5ª is operated at synchronous speed in the normal direction, that is the direction in which it tends to rotate, as in the system shown in Fig. 1, the negative-phase-sequence component will be indicated by the pointer of mechanism 9, which is connected to the induction machine 8, as previously described. However, if the rotor 5ª is operated at synchronous speed in the opposite direction, that is, in the direction in opposition to that in which it normally tends to rotate, the double-frequency voltage induced therein becomes a measure of the positive-phase-sequence component of the unbalanced voltage of the supply-circuit, and a corresponding indication is furnished by the indicating mechanism 9.

Referring to Fig. 3, the system shown comprises the supply-circuit conductors 1, 2 and 3, with which are associated a plurality of star-connected secondary windings 45, 46 and 47 of a current transformer, which are connected to the stator windings 30, 31 and 32 in the same manner as described in connection with Fig. 2.

The rotor winding 36 and its slip rings 37 are provided, as previously described, and the star-connected condensers 39 are associated with the rotor winding 36.

A second rotor winding 48 is mounted upon the shaft 38 and is provided with three slip rings 49, with which three star-connected condensers 50 are also connected.

A second set of stator windings 51, 52 and 53 are connected to the secondary transformer windings 45, 46 and 47 in a reverse sense with respect to the connections of the stator windings 30, 31 and 32. An induction machine 55 and suitable indicating mechanism 56 are provided in connection with the stator windings 51, 52 and 53, in a manner similar to that previously set forth in connection with Fig. 2. A plurality of condensers 54 are connected in shunt relation to the stator windings 51, 52 and 53.

As set forth in connection with Fig. 2, the illustrated condensers are anti-resonant with the open-circuit reactance of the associated stator windings, in each case, to one phase-sequence component, depending upon the direction of rotation of the rotor winding.

By reason of the reversed relative connections of the two sets of stator windings, the induction machine 8 is adapted to furnish an indication of the positive-phase-sequence component, while the induction machine 55 is adapted to furnish an indication of the negative-phase-sequence component of the unbalanced current traversing the supply-circuit.

Upon rotation of the rotor windings 36 and 48 at synchronous speed, the illustrated sets of condensers 39 and 50 become resonant to the positive-phase-sequence impedance and the negative-phase-sequence impedance, respectively, under the double-frequency conditions in the respective rotor windings 36 and 48 that are caused by such rotation of the shaft 38, as previously explained.

Since the system shown in Fig. 2 furnishes an indication of either the positive or the negative-phase-sequence component of the voltage on an unbalanced circuit, while the system shown in Fig. 3 provides an indication of either the positive or the negative-phase-sequence component of the current traversing the same circuit, it follows that a combination of the indications, in accordance with familiar principles of wattmeter construction, will furnish an indication of the positive-phase-sequence component or negative-phase-sequence component watts or power in the supply circuit under such unbalanced conditions.

I do not wish to be restricted to the specific circuit connections or arrangements of parts herein set forth, as various modifications thereof may be made without departing from the spirit and scope of my invention. I desire, therefore, that only such limitations shall be imposed as are indicated in the appended claims.

I claim as my invention:

1. In an electrical system, the combination with a supply circuit, of a measuring system comprising a dynamo-electric machine having a stator winding energized in accordance with an electrical quantity of the supply circuit and having a rotor winding, means for driving said rotor winding at synchronous speed with respect to said supply circuit and an induction machine connected to said stator winding.

2. In an electrical system, the combination with a supply circuit, of a measuring system comprising a dynamo-electric machine having a stator winding deriving energy from the supply circuit and having a rotor winding, means for driving said rotor winding at synchronous speed with respect to the frequency of the supply circuit, an induction machine connected to said stator winding and indicating means operatively connected to said induction machine.

3. In an electrical system, the combination with a supply circuit, of a measuring system comprising a dynamo-electric machine having its polyphase stator windings energized from said supply circuit and having a rotor winding, an induction machine connected to said stator windings, a plurality of sets of capacitance devices rsepectively associated with the stator and the rotor windings, and means for synchronously actuating said rotor winding.

4. In an electrical system, the combination with a supply circuit, of a measuring system comprising a dynamo-electric machine having its polyphase stator windings energized from said supply circuit and having a rotor winding, an induction machine connected to said stator windings, a plurality of condensers severally connected in parallel relation to said stator windings, a plurality of condensers connected in star relation to said rotor winding, and means for synchronously actuating said rotor winding.

5. In an electrical system, the combination with a supply circuit, of a measuring system comprising a dynamo-electric machine having its polyphase stator windings energized from said supply circuit and having a rotor winding, an induction machine connected to said stator windings, a plurality of condensers severally connected in parallel relation to said stator windings and of such value as to be anti-resonant therewith, at the open-circuit value of reactance thereof, to currents of the system frequency, a plurality of condensers connected in star relation to said rotor winding and of such value as to be resonant therewith to currents of double the system frequency in said rotor winding, and means for synchronously actuating said rotor winding.

6. In an electrical system, the combination with a supply circuit, of a measuring system comprising a dynamo-electric machine having its polyphase stator windings energized from said supply circuit and having a rotor winding, an induction machine connected to said stator windings, a plurality of condensers severally connected in parallel relation to said stator windings and of such values as to be anti-resonant therewith to currents of the system frequency, a plurality of condensers connected in star relation to said rotor winding and resonant therewith to currents of double the system frequency in said rotor winding, and means for synchronously actuating said rotor winding in a predetermined direction to indicate either the positive or the negative phase-sequence component of the supply circuit voltage.

7. In an electrical system, the combination with a supply circuit, of a measuring system comprising a dynamo-electric machine having its polyphase stator windings energized from said supply circuit and having a rotor winding, an induction machine connected to said stator windings, indicating means operatively connected to said induction machine, a plurality of condensers severally connected in parallel relation to said stator windings, and of such values as to be anti-resonant therewith to currents of the system frequency, a plurality of condensers connected in star relation to said rotor winding and resonant therewith to currents of double the system frequency in said rotor winding, and means for synchronously actuating said rotor winding in a predetermined direction to cause said indicating means to indicate either the positive or the negative-phase-sequence component of the supply-circuit voltage.

8. In an electrical system, the combination with a supply circuit, of a measuring system comprising a dynamo-electric machine having its polyphase stator windings energized from said supply circuit and having a rotor winding, a second dynamo-electric machine having its polyphase stator windings energized from said supply circuit in a reverse sense from those of the first-named machine, said second machine having a rotor winding operable with the first-named rotor winding, a plurality of induction machines connected to the respective sets of stator windings, a plurality of sets of capacitance devices respectively associated with the sets of stator windings and with the rotor windings, and means for synchronously actuating the rotor windings.

9. In an electrical system, the combination with a supply circuit, of a measuring system comprising a dynamo-electric machine having its polyphase stator windings energized from said supply circuit and having a rotor winding, a second dynamo-electric machine having its polyphase stator windings energized from said supply circuit in a reverse sense from those of the first-named machine, and said second machine having a rotor winding operable with the first-named rotor winding, a plurality of induction machines connected to the respective sets of stator windings, a plurality of condensers severally connected in parallel relation to said stator windings, a plurality of condensers connected in star relation to the respective rotor windings, and means for synchronously actuating said rotor windings.

10. In an electrical system, the combination with a supply circuit, of a measuring system comprising a dynamo-electric machine having its polyphase stator windings energized from said supply circuit and having a rotor winding, a second dynamo-electric machine having its polyphase stator windings energized from said supply circuit in a reverse sense from those of the first-named machine, said second machine having a rotor winding operable with the first-named rotor winding, a plurality of induction machines connected to the respective sets of stator windings, a plurality of condensers severally connected in parallel relation to said stator windings, and of such values as to be anti-resonant therewith to currents of the system frequency, a plurality of condensers connected in star relation to the respective rotor windings and resonant therewith to currents of double system frequency in said rotor windings and means for synchronously actuating said rotor windings.

11. In an electrical system, the combination with a supply circuit, of a measuring system comprising a dynamo-electric machine having its polyphase stator windings energized from said supply circuit and having a rotor winding, a second dynamo-electric machine having its polyphase stator windings energized from said supply circuit in a reverse sense from those of the first-named machine, said second machine having a rotor winding operable with the first-named rotor winding, a plurality of induction machines connected to the respective sets of stator windings, a plurality of condensers severally connected in parallel relation to said stator windings, and of such values as to be anti-resonant therewith to currents of the system frequency, a plurality of condensers connected in star relation to the respective rotor windings and resonant therewith to currents of double system frequency in said rotor windings and means for synchronously actuating said rotor windings to cause the induction machines to respectively operate in accordance with the positive and the negative-phase-sequence components of the supply current.

12. In an electrical system, the combination with a supply circuit, of a measuring system comprising a dynamo-electric machine having its polyphase stator windings energized from said supply circuit and having a rotor winding, a second dynamo-electric machine having its polyphase stator windings energized from said supply circuit in a reverse sense from those of the first-named machine, said second machine having a rotor winding operable with the first-named rotor winding, a plurality of induction machines connected to the respective sets of stator windings, a plurality of indicating means respectively connected to said induction machines to cause the respective indicating means to indicate the positive and the negative-phase-sequence components of the supply current.

In testimony whereof, I have hereunto subscribed my name this 25th day of August 1921.

CHARLES LeG. FORTESCUE.